H. W. KING.
FLUID METER.
APPLICATION FILED JUNE 7, 1911.
1,124,144.
Patented Jan. 5, 1915.
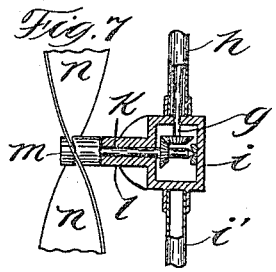
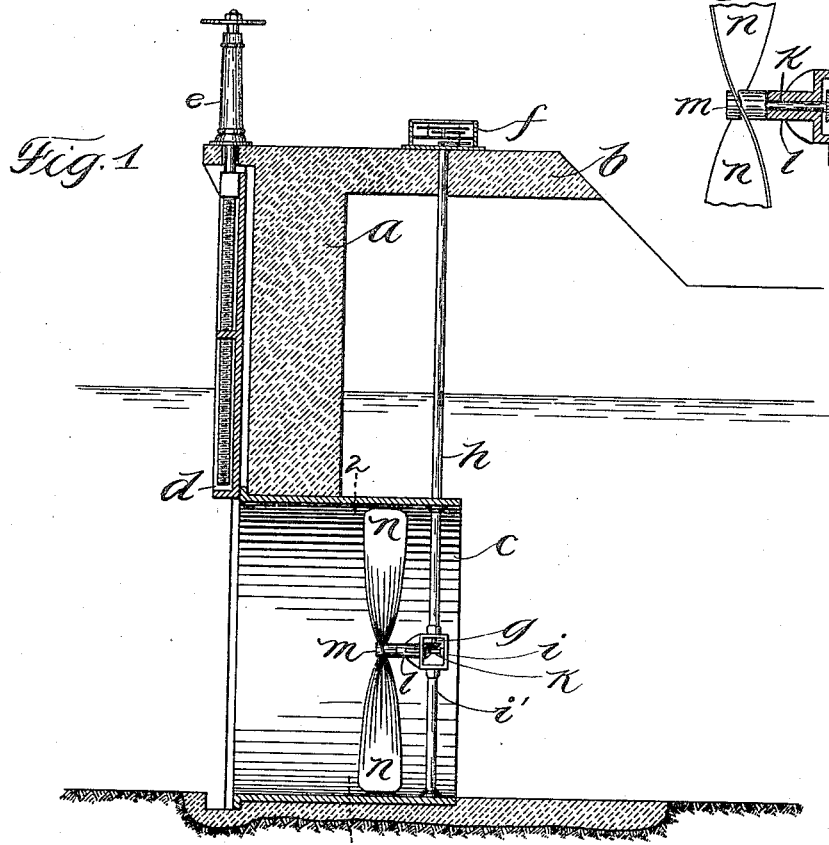
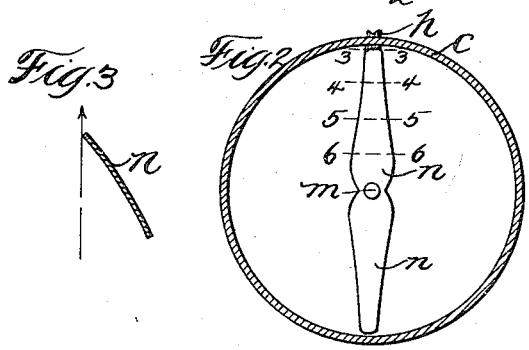
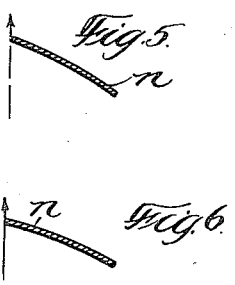
WITNESSES:
Etta L. White
Max S. Rosenzweig
INVENTOR
HORACE W. KING
BY G. L. Cragg
ATTORNEY

UNITED STATES PATENT OFFICE.

HORACE W. KING, OF CHICAGO, ILLINOIS.

FLUID-METER.

1,124,144.  Specification of Letters Patent.  Patented Jan. 5, 1915.

Application filed June 7, 1911. Serial No. 631,849.

*To all whom it may concern:*

Be it known that I, HORACE W. KING, citizen of the United States, residing at Chicago, in the county of Cook and State of Illinois, have invented a certain new and useful Improvement in Fluid-Meters, of which the following is a full, clear, concise, and exact description, reference being had to the accompanying drawings, forming a part of this specification.

My invention relates to liquid meters and is of particular use for the purpose of measuring the flow of liquids through large channels or pipes.

It is the object of my invention to provide a measuring element operating device that may be located in the path of the flowing liquid and which is of such a nature as not materially to interfere with the progress of the liquid and matter therein that may be moving therewith.

My invention is of particular service in measuring the flow of water through an irrigation head gate which may be a main head gate or a head gate individually located upon a farm. The meter actuating mechanism that is located within the bore of the piping of the head gate is of such a nature, in accordance with my invention, as to oppose a limited obstruction to any foreign matter flowing in the water such as sticks, driftwood, weeds, etc., whereby the meter actuating mechanism is prevented from causing an accumulation of foreign matter at the head gate that would obstruct the flow of the water and interfere with the operation of the meter.

My invention, as preferably practised, includes a counter or indicator which may be of usual or preferred type and which is so well known as to require no description. This mechanism in irrigation practice is an integrating mechanism for the purpose of totalizing the quantity of water that has flowed by the head gate. A power connection intervenes between this well known mechanism and the novel portion of the mechanism constructed in accordance with my invention and which is located within the bore of the pipe that is employed for establishing flow through the head gate. This mechanism within the pipe includes, in the preferred embodiment of the invention, a rotatable shaft or hub that is co-axial with the piping and which is in gear connection with the counting or measuring mechanism. This rotatable shaft or hub desirably carries two symmetrically arranged and diametrically alined blades having twisted surfaces and which rotate in a plane that is preferably at right angles to the bore of the piping. Ample clearance is afforded laterally of the blades for permitting the passage of foreign matter that may flow through the bore of the piping in which the blades are inclosed.

I will explain my invention more fully by reference to the accompanying drawing showing the preferred embodiment thereof and in which—

Figure 1 is a vertical sectional view of a well known type of head gate with the mechanism of my invention shown within the bore of the piping that forms a component part of the head gate; Fig. 2 is a sectional view on line 2 2 of Fig. 1; Figs. 3, 4, 5 and 6 are cross-sectional views of one of the blades taken respectively on lines 3 3, 4 4, 5 5, and 6 6, the blades being desirably of similar formation with symmetrical arrangement; and Fig. 7 is a detail view of a portion of the meter operating mechanism located within the pipe through which the fluid passes.

Like parts are indicated by similar characters of reference throughout the different figures.

I have not deemed it necessary to show all of a head gate structure as such is so well known to those skilled in the art. I have illustrated in Fig. 1 a curtain wall $a$ and a deck $b$ which are usually formed of concrete. A circular piping $c$ projects through the bottom of the curtain wall $a$ and establishes communication between the front and rear of said curtain wall. A gate $d$ is adapted to be moved in a vertical plane by means of well known gate operating mechanism $e$. This gate, when completely lowered, serves to close the front end of the pipe $c$, and when elevated to open said pipe. Well known integrating measuring mechanism of the meter is shown at $f$ upon the deck $b$. A meter operating shaft $g$ is in gear connection with the counting mechanism $f$, this shaft $g$ passing through the tubular housing $h$ that extends through the top of the pipe $c$ and through the deck $b$, the bore of the pipe $h$ being in excess of the diameter of the shaft $g$ to permit said shaft freely to operate, the pipe $h$ acting as a guard to protect the shaft $g$ from injury.

The lower end of the pipe $h$ is rigidly connected with a housing $i$ into whose interior the shaft $g$ projects. The housing $i$ is in turn supported upon the upper end of a standard $i^1$ whose lower end is mounted upon the bottom of the pipe $c$. Another shaft $k$, in gear connection with the shaft $g$, also projects into the interior of the housing $i$ and is free to rotate in a bearing $l$ that is carried by said housing. A hub $m$ is rigidly secured to the outer end of the shaft $k$ and carries the blades $n$ that are preferably of the shape illustrated. The hub $m$ and the shaft $k$ are co-axial with the pipe $c$ so that the plane of rotation of the blades $n$ is perpendicular to the axis of the pipe $c$, though I do not wish to be limited to this particular transverse location of the plane of rotation of the blades. By the construction shown, the blades are provided with a normally fixed axis of rotation. As I preferably employ two blades, they are desirably placed in diametrical alinement and are symmetrically related. The blades are preferably elongated, that is they are narrow as compared with their length so that ample clearance is afforded laterally of the blades to prevent the blades from collecting material in the piping and thereby avoid not only obstruction to the operation of the meter, but also stoppage of the flow of water. The outer ends of the blades desirably very closely approach the wall of the piping so that the hub $m$ of the blades may be subject to a torque proportionate to the average velocity of the water flowing through the entire bore of the piping, the blades being inclined at gradually decreasing angles to the direction of the water flow (which direction is indicated by dash lines in Figs. 3 to 6 inclusive) when said angles are measured from the hub $m$ toward the extremities of the blades. That is each blade, by extending from the axis of the pipe $c$ substantially to the wall of the pipe, encounters water pressures similar to that encountered by the other blade and each blade is caused properly to respond to the action of the water pressures that vary at different places through the bore of the pipe $c$, by the proper variation of the angle of each blade to the direction of flow, as illustrated, for example, in Figs. 3 to 6 inclusive. While I have illustrated each blade as being of uniform thickness so that the rear of the blade would have an angular disposition similar to the front of the blade, yet I do not limit myself to the angular disposition of the rear of the blade since it is mainly important to provide the proper angular relation of the front of the blade to the flowing water.

While I have herein shown and particularly described the preferred embodiment of my invention I do not wish to be limited to the precise construction shown as changes may readily be made without departing from the spirit of the invention.

Having thus described my invention, I claim as new and desire to secure by Letters Patent the following:—

Apparatus of the class described including a curtain wall $a$; a circular pipe $c$ projecting through the curtain wall for permitting passage of liquid; an elongated rotatable blade substantially centrally mounted with respect to the pipe and having a normally fixed axis of rotation substantially co-incident with the axis of the pipe to define a plane of rotation for the blade transverse to the direction of the flow of the liquid through the pipe, said blade extending substantially to the wall of the pipe and presenting a face to the flowing liquid that is inclined to the direction of flow of the liquid at angles which decrease when measured from the inner end to the outer end of the blade and being reduced in width to afford ample clearance between the same and the pipe for the passage of liquid obstructing material; and an upwardly projecting shaft $h$ driven by the blade.

In witness whereof, I hereunto subscribe my name this sixth day of June A. D., 1911.

HORACE W. KING.

Witnesses:
G. L. CRAGG,
E. L. WHITE.